United States Patent
Chen et al.

(10) Patent No.: US 9,650,998 B2
(45) Date of Patent: May 16, 2017

(54) MULTI-FUEL CARBURETOR WITH GAS SWITCHING VALVE STRUCTURE

(71) Applicant: Qi An Chen, Rui An (CN)

(72) Inventors: Qi An Chen, Rui An (CN); Xingyao Zhang, Rui An (CN)

(73) Assignee: Qi An Chen, Rui An (CN)

( * ) Notice: Subject to any disclaimer, the term of this patent is extended or adjusted under 35 U.S.C. 154(b) by 372 days.

(21) Appl. No.: 14/534,928

(22) Filed: Nov. 6, 2014

(65) Prior Publication Data

US 2016/0025041 A1    Jan. 28, 2016

(30) Foreign Application Priority Data

Jul. 25, 2014 (CN) .................... 2014 2 0414010 U

(51) Int. Cl.
*F02M 21/04* (2006.01)
*F02M 21/02* (2006.01)

(52) U.S. Cl.
CPC ........ *F02M 21/04* (2013.01); *F02M 21/0212* (2013.01); *F02M 21/0215* (2013.01); *F02M 21/0239* (2013.01); *Y02T 10/32* (2013.01)

(58) Field of Classification Search
CPC .. B01F 3/02; B01F 3/04; F02M 13/08; F02M 21/04
USPC .................................................. 261/38, 64.1
See application file for complete search history.

(56) References Cited

U.S. PATENT DOCUMENTS

| | | | | | |
|---|---|---|---|---|---|
| 2,746,479 | A | * | 5/1956 | Krow | F02M 13/08 137/340 |
| 4,227,497 | A | * | 10/1980 | Mathieson | F02M 13/08 123/525 |
| 4,235,828 | A | * | 11/1980 | Howes | F02M 19/08 123/585 |
| 4,351,300 | A | * | 9/1982 | Selvidge | F02M 13/08 123/527 |
| 5,775,309 | A | * | 7/1998 | Burrahm | F02D 19/0647 123/527 |
| 7,905,469 | B2 | * | 3/2011 | Nickels | F02M 13/08 123/527 |
| 2011/0095215 | A1 | * | 4/2011 | Larsson | F02D 9/1055 251/129.01 |

* cited by examiner

*Primary Examiner* — Abbas Rashid
(74) *Attorney, Agent, or Firm* — Shimokaji IP

(57) ABSTRACT

A multi-fuel carburetor with gas switching valve structure includes a carburetor body having a throat; a gas jet pipe formed on the carburetor body, the gas jet pipe having one end extended to the throat to connect with it and another end extended out of the carburetor body; and a gas switching valve and a gas adjustor mounted on the carburetor body respectively, the gas switching valve having one end mounted on the carburetor body to connect with the gas jet pipe and another end connected with the gas adjustor, and the gas switching valve having a gas measurement hole for measuring the flow rate of gas. A gas jet pipe is added to provide multiple choices for multiple fuels. Further, a gas measurement hole is set on the switching valve, thus it's easy to choose the corresponding position to meet the gas demand for the engine.

4 Claims, 6 Drawing Sheets

MULTI-FUEL CARBURETOR WITH GAS SWITCHING VALVE STRUCTURE

RELATED APPLICATIONS

This application claims the benefit of Chinese Patent Application No. 201420414010.5, filed on Jul. 25, 2014, the entire content of which is hereby incorporated by reference in this application.

FIELD OF THE INVENTION

The present invention relates to a carburetor, and more particularly to a multi-fuel carburetor with gas switching valve structure.

BACKGROUND OF THE INVENTION

Conventional carburetors are equipments that mix the proportional gasoline with air in a vacuum condition generated by an engine so as to supply mixed gas to the engine. A conventional carburetor includes a throat, a jet pipe and a floater chamber for storing gasoline from the gasoline tank. The throat shaped as a wasp waist has two wider end openings and a narrow middle portion, therein one end opening is connected with the air, and the other end opening is connected with the engine, so that the gasoline is jetted from the jet pipe to achieve the mixture between gasoline and air. However, the conventional carburetor can only achieve mixture between gasoline and air, but can not mix gas such as natural gas (NG) with air. In other words, it's unachievable to use multiple gases for the engine, which is inconvenient.

SUMMARY OF THE INVENTION

Accordingly, an object of the present invention is to provide a multi-fuel carburetor with gas switching valve structure that is convenient for users to choose different gases to supply for the engine.

To achieve the above-mentioned object, the present invention provides a multi-fuel carburetor with gas switching valve structure, which includes a carburetor body having a throat; a gas jet pipe formed on the carburetor body, the gas jet pipe having one end that is extended to the throat to connect with it and another end that is extended out of the carburetor body; and a gas switching valve and a gas adjustor mounted on an outer side of the carburetor body respectively, the gas switching valve having one end that is mounted on the carburetor body to connect with the gas jet pipe and another end that is connected with the gas adjustor, and the gas switching valve having a gas measurement hole provided thereon for measuring the flow rate of gas.

Preferably, the gas switching valve includes a valve body, a sealing gasket, a switching handle, a gasket ring, and a valve body hold-down plate; the gas measurement hole, the valve body, the sealing gasket, the switching handle, the gasket ring, and the valve body hold-down plate are mounted on the valve body in turn, the valve body includes a gas-in pipe and a gas-out pipe, the gas measurement hole comprises LPG measurement hole and NC measurement hole which are set on the gas-in pipe respectively, and the gas-out pipe is connected with the gas jet pipe; at least one through hole is provided on the sealing gasket which is mounted between the valve body and the switching handle, an curved groove is provided on the switching handle to allow the gas to pass through, the gasket ring is set on the switching handle, and the valve body hold-down plate is mounted on the valve body by means of screws.

Preferably, the gasket ring is a wave-form gasket ring.

Preferably, the gas measurement holes and the valve body are formed from a single piece.

Preferably, the gas switching valve and the carburetor body are formed from a signal piece, or the gas switching valve is fixed on the carburetor body by means of screws.

In comparison with the prior art, the multi-fuel carburetor with gas switching valve structure according to the present invention adds a gas jet pipe to achieve multiple choices for multiple gases, furthermore, two measurement holes (such as LPG (liquefied petroleum gas) measurement hole and NG (nature gas) measurement hole) for measuring gas are provided on the switching valve, thus it's easy for user to rotate the switching handle to the corresponding position (such as LPG or NG marker), so as to meet the gas demand for the engine, which increases the different choices of gas for the user and improves the applicability accordingly. In other words, the carburetor of the present invention has larger and extended application scope and application field, because it's achievable to choose fuel or gas (such as LPG or NG) according to the actual demand of the user. The carburetor in the present invention adds a gas system basing on the conventional carburetor.

Figure 1:
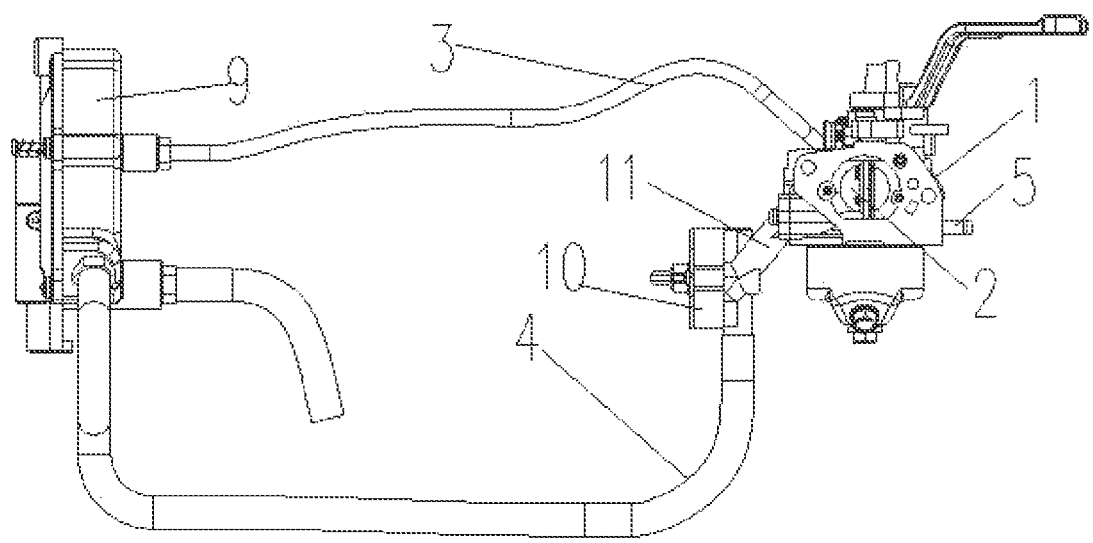
FIG. 1 is a side view of the multi-fuel carburetor according to one embodiment of the present invention.

REFERENCE NUMERALS carburetor body 1; throat 2; first pipeline 3; second pipeline 4; gasoline-in pipe 5; through hole 6; gas jet pipe 7; gas adjustor 9; gas switching valve 10; gas-in pipeline 20; valve body 12; sealing gasket 13; switching handle 14; gasket ring 15; valve body hold-down plate 16; LPG measuring hole 18; NG measuring hole 19; gas-out pipeline 11; curved groove 21.

DETAILED DESCRIPTION OF ILLUSTRATED EMBODIMENTS

In order to expatiate the technical solution to achieve the objects of the present invention further, an explanatory embodiment of the present invention and its features and advantages will now be described with reference to the Figures, wherein like reference numerals designate similar parts throughout the various views.

Figure 2:
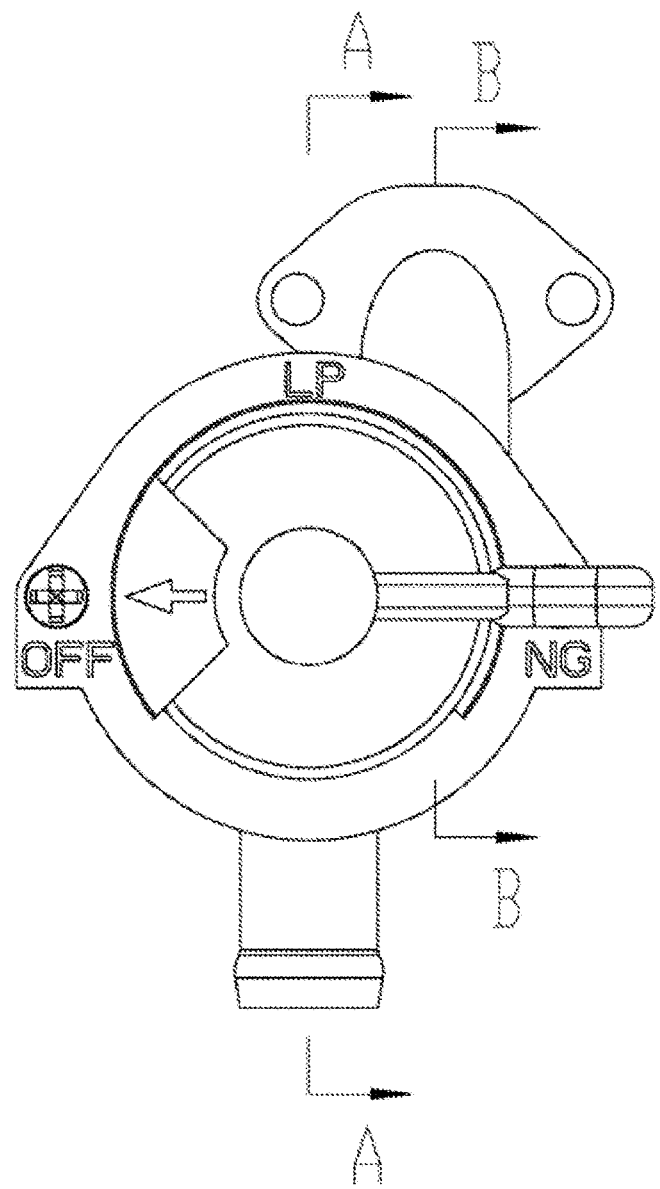
FIG. 2 is a top view of the gas switching valve.
Figure 3:
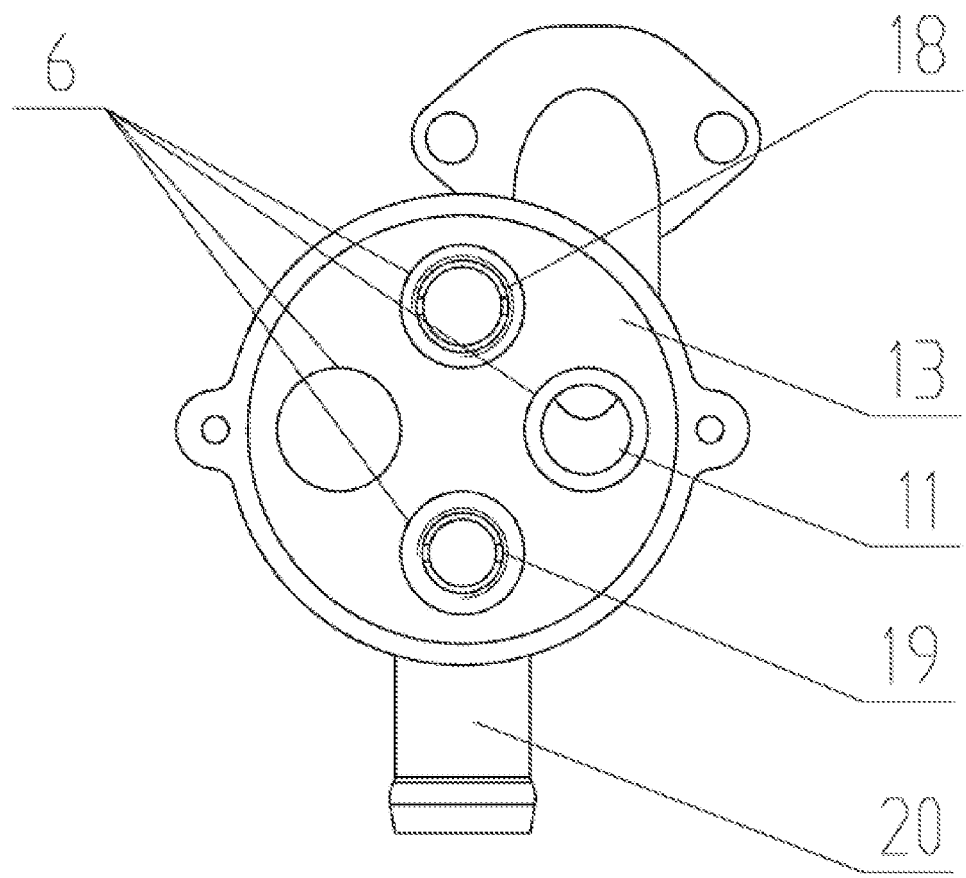
FIG. 3 is a top view of FIG. 2 in which the switching handle is removed.
Figure 4:
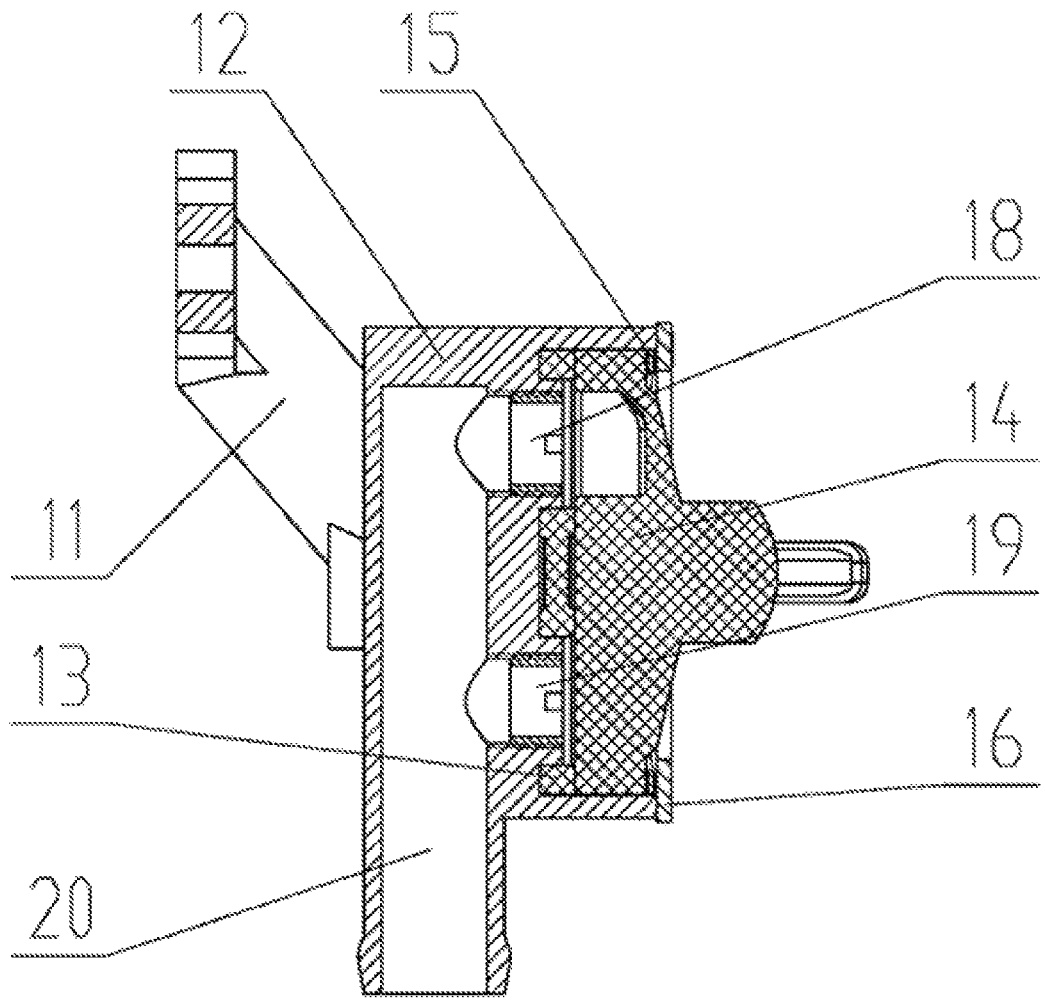
FIG. 4 is a cross-sectional view along A-A line in FIG. 2.
Figure 5:
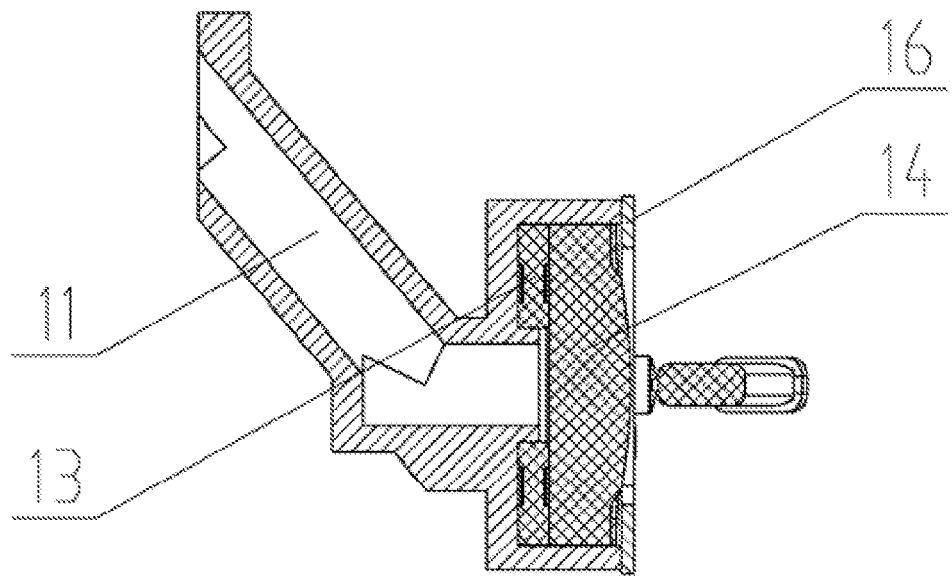
FIG. 5 is a cross-sectional view along B-B line in FIG. 2.
Figure 6:
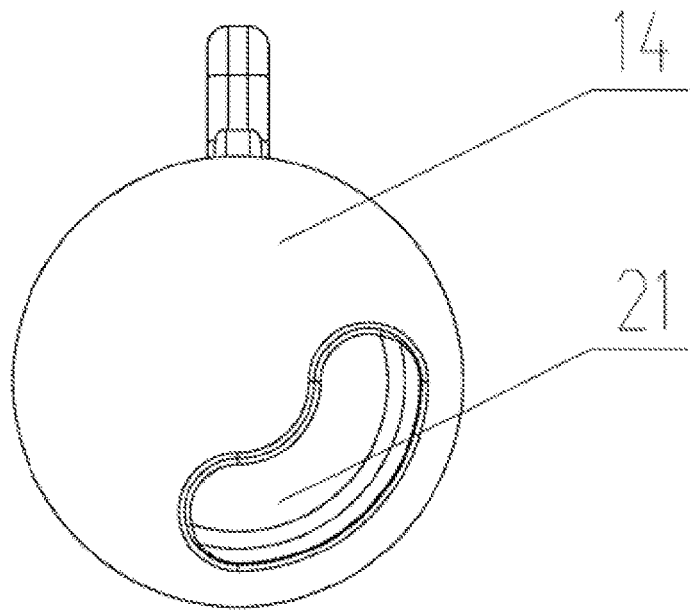
FIG. 6 is a section view of the switching handle.
Figure 7:
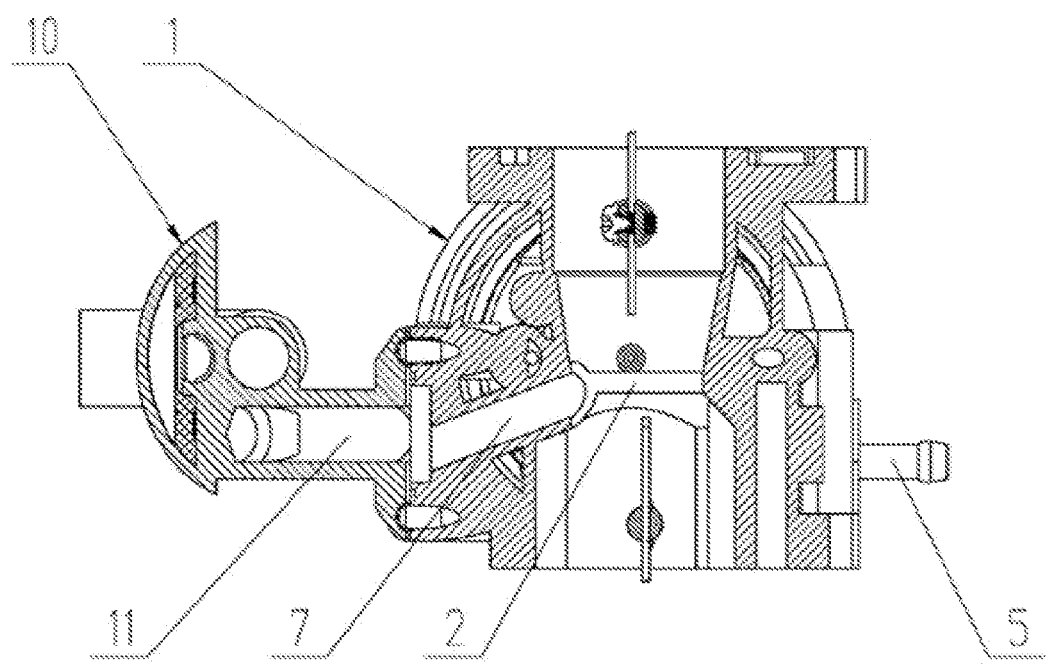
FIG. 7 is a section view of the carburetor body and the gas switching valve connected together.

Referring to FIGS. 1-7, a multi-fuel carburetor with gas switching valve structure according to the present invention includes a carburetor body 1 which is connected with a first pipeline 3 of a gas supply device. A second pipeline 4 of the gas supply device is connected with a gas-in pipeline 20. The carburetor body 1 includes a throat 2, and a gas jet pipe 7 is formed on the carburetor body 1. One end of the gas jet pipe 7 is extended to the throat 2 to connect with it, and the other end is extended out of the carburetor body 1. A gas switching valve 10 and a gas adjustor 9 are mounted on an outer side of the carburetor body 1 respectively. Specifically, one end of the gas switching valve 10 is mounted on the carburetor body 1 to connect with the gas jet pipe 7, and the other end is connected with the gas adjustor 9. Optionally, the gas switching valve 10 may be mounted on the carburetor body 1 by means of screws, etc. Alternatively, the gas switching valve 10 and the carburetor body 1 may be formed from a signal piece, or the gas switching valve 10 may be connected to the gas adjustor 9 or placed in other positions between the carburetor body 1 and the gas adjustor 9. The gas switching valve 10 has measurement holes for measuring the flow rate of the gas, which include LPG measurement hole 18 and NC measurement hole 19 that are mounted on the switching valve body as individual parts respectively, or formed from a single piece with the switching valve body.

As shown, the gas switching valve 10 includes a valve body 12, a sealing gasket 13, a switching handle 14, a gasket ring 15, and a valve body hold-down plate 16. The LPG measurement hole 18, the NG measurement hole 19, the sealing gasket 13, the switching handle 14, the gasket ring 15, and the valve body hold-down plate 16 are mounted on the valve body 12 in turn. Specifically, the gasket ring 15 is a wave-form gasket ring. The valve body 12 includes the gas-in pipeline 20 on which the LPG measurement hole 18 and NG measurement hole 19 are set respectively and a gas-out pipeline 11 that is connected with the gas jet pipe 7. The sealing gasket 13 has at least one through hole 6 formed thereon, therein the number of the through hole 6 is corresponding with that of the holes formed on the valve body 12. In this embodiment, four through holes 6 are evenly distributed on circle surface of the sealing gasket 13. Concretely, the LPG measurement hole 18 and NG measurement hole 19 are interconnected to the gas-in pipeline 20 respectively, every hole in the horizontal direction and the valve body 12 are formed from a single piece, but not connected with the gas-in pipeline 20 and the gas-out pipeline 11 at the same time, and the gas-out pipeline 11 is extended to connect with the gas jet pipe 7 in the horizontal direction. The sealing gasket 13 is fixed between the valve body 12 and the switching handle 14, and a curved groove is provided on the switching handle 14. The gasket ring 15 is set on the switching handle 14, and the valve body hold-down plate 16 is mounted on the valve body 12 by means of screws.

Based on the structure of the carburetor according to the present invention, the LPG measurement hole 18 and the NG measurement hole 19 for measuring the gas are configured on the switching valve 10, as a result, when the switching handle 14 is rotated, the NG gas measurement hole 19 or the LPG gas measurement hole 18 will be communicated with the gas-out pipeline 11 by means of the curved groove 21 of the switching handle 14, which causes the demanded gas go into the carburetor, and further switch different kind of gas so as to meets the gas demands for the engine.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A multi-fuel carburetor with gas switching valve structure, comprising:
   a carburetor body having a throat;
   a gas jet pipe formed on the carburetor body, the gas jet pipe having one end that is extended to the throat to connect with it and another end that is extended out of the carburetor body; and
   a gas switching valve and a gas adjustor mounted on an outer side of the carburetor body respectively, the gas switching valve having one end that is mounted on the carburetor body to connect with the gas jet pipe and another end that is connected with the gas adjustor, and the gas switching valve having a gas measurement hole provided thereon for measuring a flow rate of gas,
   wherein the gas switching valve comprises a valve body, a sealing gasket, a switching handle, a gasket ring, and a valve body hold-down plate; the gas measurement hole, the valve body, the sealing gasket, the switching handle, the gasket ring, and the valve body hold-down plate are mounted on the valve body in turn, and the valve body comprises a gas-in pipe and a gas-out pipe, the gas measurement hole comprises an LPG measurement hole and an NC measurement hole which are set on the gas-in pipe respectively, and the gas-out pipe is connected with the gas jet pipe; at least one through hole is provided on the sealing gasket which is mounted between the valve body and the switching handle, a curved groove is provided on the switching handle to allow the gas to pass through, the gasket ring is set on the switching handle, and the valve body hold-down plate is mounted on the valve body by means of screws.

2. The multi-fuel carburetor with gas switching valve structure according to claim 1, wherein the gasket ring is a wave-form gasket ring.

3. The multi-fuel carburetor with gas switching valve structure according to claim 1, wherein the gas measurement hole and the valve body are formed from a single piece.

4. The multi-fuel carburetor with gas switching valve structure according to claim 1, wherein the gas switching valve and the carburetor body are formed from a single piece, or the gas switching valve is fixed on the carburetor body by means of screws.

* * * * *